(12) United States Patent
Fernandes et al.

(10) Patent No.: US 12,437,081 B2
(45) Date of Patent: Oct. 7, 2025

(54) OFFLINE PLATFORM INFORMATION TECHNOLOGY CYBER-PHYSICAL RISK MITIGATION

(71) Applicant: Knowledge Based Systems, Inc., College Station, TX (US)

(72) Inventors: Ronald Fernandes, College Station, TX (US); Andrew Stephenson, Beavercreek, OH (US); Richard J. Mayer, College Station, TX (US)

(73) Assignee: Knowledge Based Systems, Inc., College Station, TX (US)

( * ) Notice: Subject to any disclaimer, the term of this patent is extended or adjusted under 35 U.S.C. 154(b) by 177 days.

(21) Appl. No.: 18/465,859

(22) Filed: Sep. 12, 2023

(65) Prior Publication Data

US 2024/0095372 A1    Mar. 21, 2024

Related U.S. Application Data

(60) Provisional application No. 63/376,001, filed on Sep. 16, 2022.

(51) Int. Cl.
*G06F 21/57*  (2013.01)

(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS

| | | | |
|---|---|---|---|
| 12,067,857 B1 * | 8/2024 | Shah | G06N 3/08 |
| 2016/0028754 A1 * | 1/2016 | Cruz Mota | H04L 63/1458 |
| | | | 726/23 |
| 2018/0159881 A1 * | 6/2018 | Crabtree | H04L 63/1425 |
| 2018/0295154 A1 * | 10/2018 | Crabtree | H04L 63/1433 |
| 2020/0226251 A1 * | 7/2020 | Ferragut | G06F 21/552 |
| 2022/0078203 A1 * | 3/2022 | Shakarian | G06F 16/951 |
| 2022/0104074 A1 * | 3/2022 | Dakshinkar | H04W 12/122 |
| 2024/0031391 A1 * | 1/2024 | Baikalov | H04L 63/145 |
| 2024/0073223 A1 * | 2/2024 | Weizman | H04L 12/4675 |
| 2024/0095372 A1 * | 3/2024 | Fernandes | G06F 21/577 |

* cited by examiner

*Primary Examiner* — Meng Li
(74) *Attorney, Agent, or Firm* — Schwegman Lundberg & Woessner, P.A.

(57) ABSTRACT

Systems and techniques for offline platform information technology cyber-physical risk mitigation are described herein. System configuration data may be obtained for a platform information technology (PIT) computing system. A system model may be generated for the PIT computing system using the system configuration data. An attack path and mitigation data set may be generated from vulnerability and mitigation data. A risk profile may be generated for the PIT computing system by evaluating the attack path and mitigation data set using the system model. A security mitigation action may be automatically triggered based on a vulnerability detected in the risk profile.

20 Claims, 7 Drawing Sheets

OFFLINE PLATFORM INFORMATION TECHNOLOGY CYBER-PHYSICAL RISK MITIGATION

CROSS-REFERENCE TO RELATED APPLICATION

This patent application is a non-provisional of and claims the benefit of priority to U.S. Provisional Patent Application Ser. No. 63/376,001, filed Sep. 16, 2022, which is incorporated herein by reference in its entirety.

TECHNICAL FIELD

Embodiments described herein generally relate to computer system cyber-attack path analysis and mitigation and, in some embodiments, more specifically to offline platform information technology cyber-physical risk mitigation.

BACKGROUND

Cyber-attacks may utilize vulnerabilities in computerized systems to gain unauthorized access to a system. The unauthorized access may expose confidential data or allow an attacker to gain unauthorized operational control of a system. The exposed data and unauthorized control may have dire consequences that may include loss of a system, system instability, or loss of human life based on the severity of the attack. Self-contained systems (e.g., mission capable systems, etc.) may not maintain continuous network communication with existing threat detection technology and may lack technical capability to execute a stand-alone threat management function. It may be desirable to analyze these offline systems for cyber threats in an effort to mitigate vulnerabilities before the vulnerabilities may be exploited.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
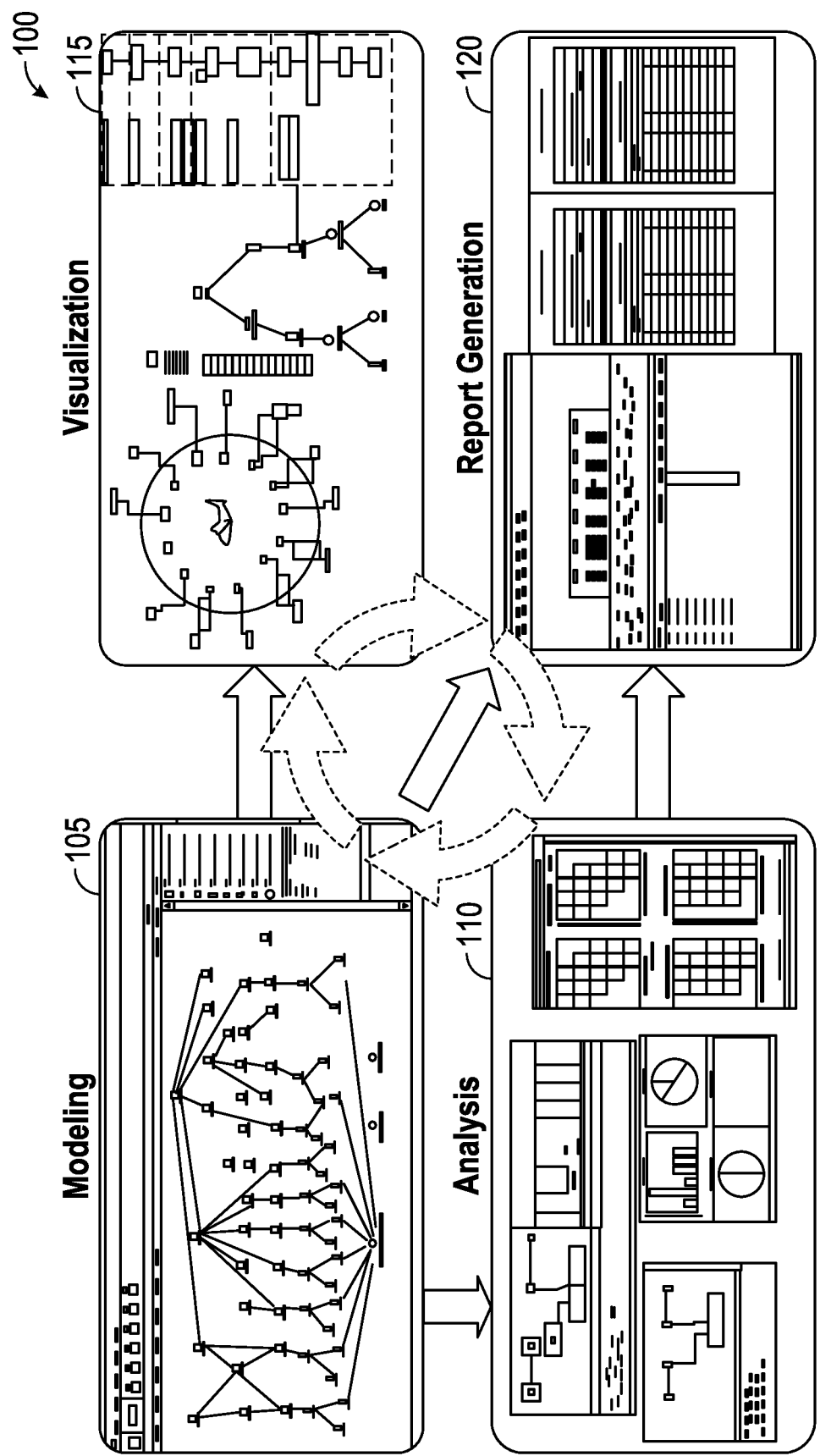
FIG. 1 is a block diagram of an example of an environment for offline platform information technology cyber-physical risk mitigation, according to an embodiment.

Reliance on computer hardware and software provides many benefits while also exposing additional attack paths for a potential attacker. While the use of sophisticated computers has advanced the capabilities of technological systems, systems are becoming increasingly susceptible to cyber-attacks and exploitation that may result in degraded performance, financial loss, loss of human life, etc. The complexity and labor-intensive nature of various activities/processes required to understand, analyze, and document cybersecurity aspects of systems make it infeasible for a human to make risk assessments and mitigation decision in real-time for offline systems. Real-time detection and mitigation may be a requirement to maintain the safety and security of mission critical systems. These problems are magnified when applied to platform information technology (PIT) (e.g., cars, electric grids, airplanes, ships, etc.). PIT includes hardware and software components that work in conjunction in real time to provide mission performance of special purpose systems. The PIT may work together as a unit to perform mission executives without connectivity to external systems. Thus, a PIT may represent a self-contained collection of hardware and software that may execute a mission of a special purpose system. These complex PIT systems make it difficult to execute comprehensive cyber-security analysis, cyber resiliency analysis, and risk management and may be incapable of being monitored remotely due to a lack of connectivity due to mission requirements or physical unavailability of connection modalities.

The systems and techniques discussed herein create a repeatable framework for modeling, understanding, assessing, documenting, and reducing risk of cyber threats and vulnerabilities for technically complex PIT systems. The systems and techniques discussed herein enable guidance and automation for execution of PIT system cybersecurity understanding and analysis. The guidance and automation enables efficient risk management for PIT systems.

Existing cybersecurity risk management processes for enterprises exist, such as The National Institute of Standards and Technology (NIST) Risk Management Framework (RMF). In particular, cybersecurity risk management processes, such as RMF, focus on enterprise information technology (EIT) and not on PIT. Existing PIT cybersecurity analysis processes are manual, labor intensive, expensive and thus, may not be completed in real-time. Existing PIT analysis processes are unable to perform automated detection and mitigation of threats to PIT systems.

The systems and techniques discussed herein may include a software suite (e.g., a set of machine-readable instructions executable by at least one processor to form computer circuitry, etc.) that utilizes system models to guide and automate the visualization, analysis, and reporting on cyber-security risk management aspects of PIT systems. Additionally, continuous monitoring capability is enabled to routinely identify evolving knowledge of real-world system vulnerabilities and mitigation strategies leading to effective and efficient cybersecurity risk reduction. Benefits of the systems and techniques discussed herein include zero system intervention by human actors, rapid cybersecurity risk management (e.g., real-time, etc.), reduced manpower requirements, reduced cost, and lower risks of data exfiltration, system malfunction, loss of human life, etc.

FIG. 1 is a block diagram of an example of an environment 100 for offline platform information technology cyber-physical risk mitigation, according to an embodiment.

An attacker of a PIT system may attempt to exploit software, firmware, protocols, hardware, encryption algorithms, etc. of a PIT system to gain access to further the attack, take unauthorized control of the PIT system, or exfiltrate data from the PIT system. The PIT systems may be self-contained and may be incapable of being monitored by conventional risk monitoring and management tools that may rely on network monitoring or a local agent installed on a system. The systems and techniques discussed herein enable offline risk monitoring and management by generating a system model using a modeling engine 105 based on input data that is imported from existing systems specifications via common standard data formats. In an example, the system model may be a graph model.

The system model may define a profile for a PIT system with varying levels of granularity. For example, the system model may define a PIT system in terms of line replaceable units (LRUs), architecture blocks, hardware and software components, etc. Examples of LRUs include, by way of example and not limitation, mission computer, communications computer (e.g., radio controller), aircraft control unit, etc. In an example, existing system models may be used to develop a system model for a new or unknown PIT system by evaluating configuration similarities between the existing system models and the unknown PIT system allowing immediate protection for PIT systems as they enter service. The system model is utilized by an analysis engine 110 to determine and predict possible cyber-attack paths, threats, vulnerabilities, and risk associated with the system. The system model is evaluated in combination with attack path data developed using vulnerability and mitigation data that describes current threats and corresponding threat mitigation data.

A variety of actions may be triggered based on a detection or prediction of a potential security vulnerability. For example, a number of cybersecurity reports may be automatically generated by a report generator 120 based on the system cybersecurity posture (e.g., as output by the analysis engine 110, etc.) and optimal mechanisms for reducing cyber risks may be output by a visualization engine 115 or may be automatically triggered to mitigate predicted threats. In an example, the cybersecurity posture may include physical security of the PIT system to prevent an attacker from exploiting a physical vulnerability (e.g., a connection port of the PIT system, etc.), mission configurations (e.g., mission time, mission location, external accessibility of the PIT system, etc.), etc. In an example, the reports may include physical security measures to be implemented for the PIT device or an order may be automatically initiated to implement physical security of the PIT system.

In an example, cybersecurity threat analysis may include analyzing the mission configurations to deescalate (e.g., ignore, down-weight, etc.) threats that may be infeasible for an attacker to complete based on the mission configuration data. For example, a vulnerability in a cryptographic software component that has an estimated time to exploit of ten hours may be ignored when the mission configuration data indicates that the PIT system is exploitable for a maximum of one hour. Continuously monitoring and analysis of the system identifies new attack paths, threats, vulnerabilities, and mitigation strategies.

Figure 2:
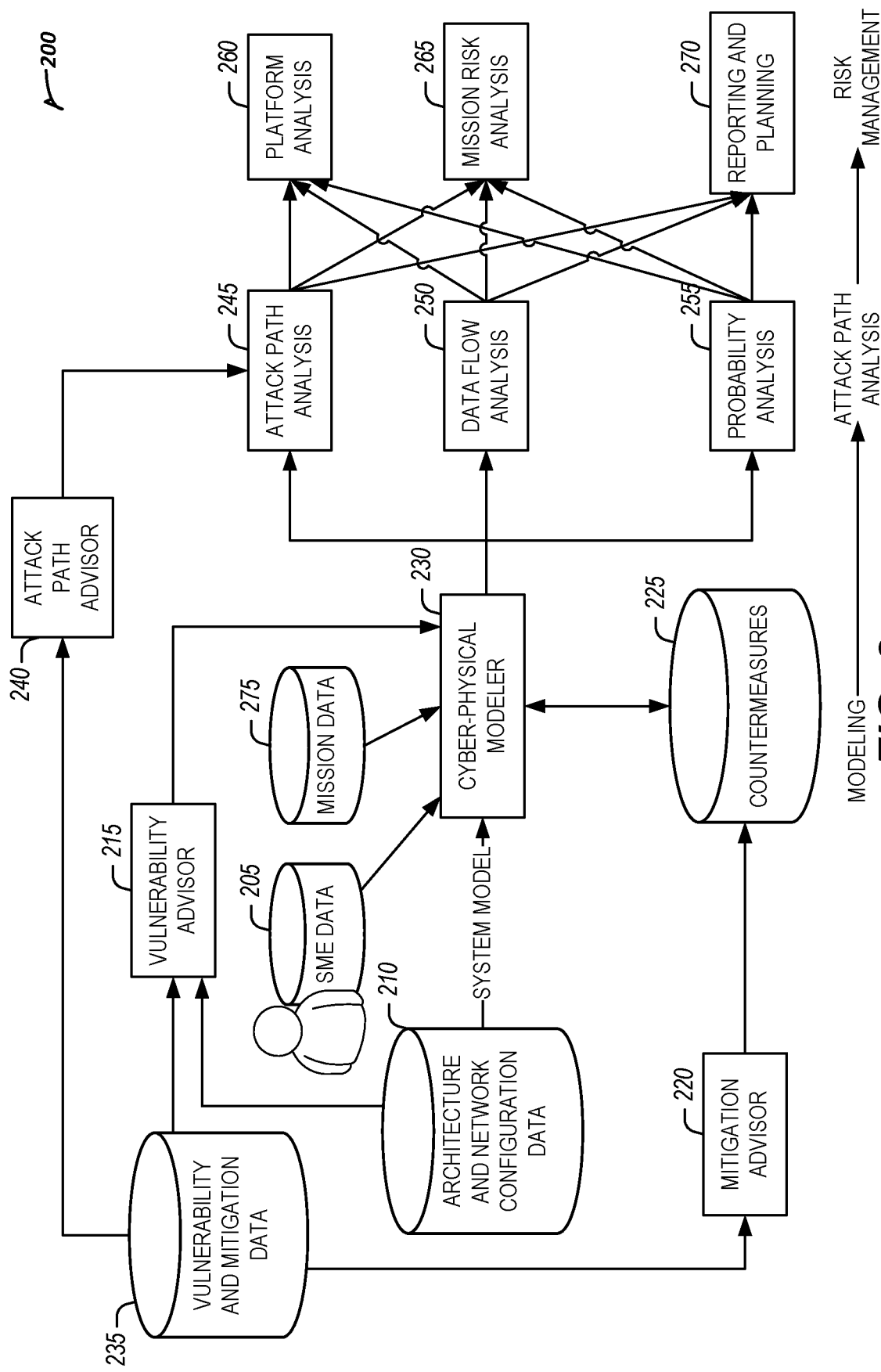
FIG. 2 is a block diagram of an example of a system for offline platform information technology cyber-physical risk mitigation, according to an embodiment.

FIG. 2 is a block diagram of an example of a system 200 for offline platform information technology cyber-physical risk mitigation, according to an embodiment. The system 200 may provide features as described in FIG. 1.

The system 200 provides a series of functions that include (i) platform information technology (PIT) cyber-physical modeling, (ii) attack path analysis, and (iii) cyber risk management. The cyber-physical modeler 230, which represents cyber information associated with physical components, automatically generates cyber-physical models using system architecture models generated from architecture and network configuration data 210 using system modeling tools (e.g., SysML®, etc.) as well as data from a subject matter expert data 205 and mission data 275. The mission data 275 includes data for missions and tasks that are executed at least in part using the system (e.g., LRU, etc.) under analysis. This includes both military missions such as Close Air Support (CAS) as well as missions other than war such as Defense Support of Civil Authorities (DSCA), Noncombatant Evacuation Operations (NEO), and Peace Operations (PO). The architecture and network configuration data 210 may include data regarding system components, software, firmware, protocols (e.g., communication protocols, software stack protocols, encryption protocols, etc.), version information, configuration settings, subcomponents, etc. for a platform or portion of a platform. A cyber-physical model is hierarchical in nature, and models systems and systems-of-systems down to a component level.

At various levels, the vulnerability advisor 215 and mitigation advisor 220 provide externally sourced (e.g., National Vulnerability Database (NVD), etc.) vulnerability and mitigation data 235 relating to the system modeled by the cyber-physical modeler 230. The vulnerability advisor 215 and mitigation advisor 220 also support continuous monitoring of evolving knowledge relating to the PIT system under consideration. PIT cybersecurity analysis uses multiple techniques to perform attack path analysis 245 using data output by an attack path advisor 240 based on evaluation of the vulnerability and mitigation data 235.

The cyber-physical model output by the cyber-physical modeler 230 is used as input for the attack path analysis 245, data flow analysis 250, and probability analysis 255. The attack path analysis 245 evaluates known and predicted Tactics, Techniques, and Procedures (TTP)s that are most detrimental to a platform's survivability. The data flow analysis 250 uses the connection information of various components of the system in order to evaluate connection-centric analysis. Probability analysis 255 uses probability-based techniques such as Bayesian analysis and Markov chains to analyze attack paths.

The output of the attack path analysis 245, the data flow analysis 250, and the probability analysis 255 are used as inputs for cyber risk management. Cyber risk management provides platform (e.g., system, etc.) level analysis 260 and mission level risk analysis 265. Cyber risk analysis that includes likelihood and impact of attacks can be done both at a platform level 260 or at a mission level 265. Various kinds of reporting and planning 270 artifacts are autogenerated to support cyber-physical risk management.

Figure 6:
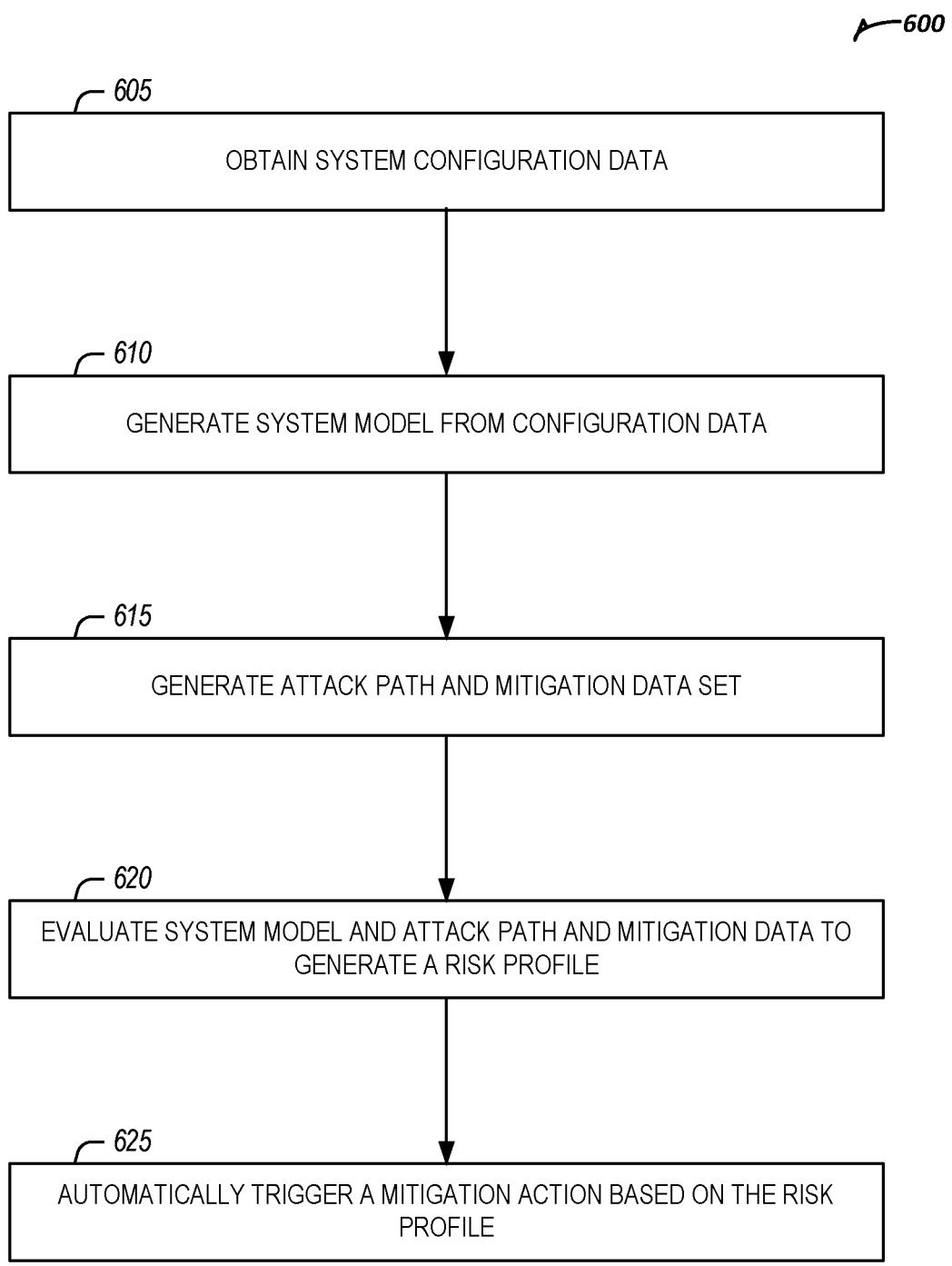
FIG. 6 illustrates an example of a method for offline platform information technology cyber-physical risk mitigation, according to an embodiment.
Figure 7:
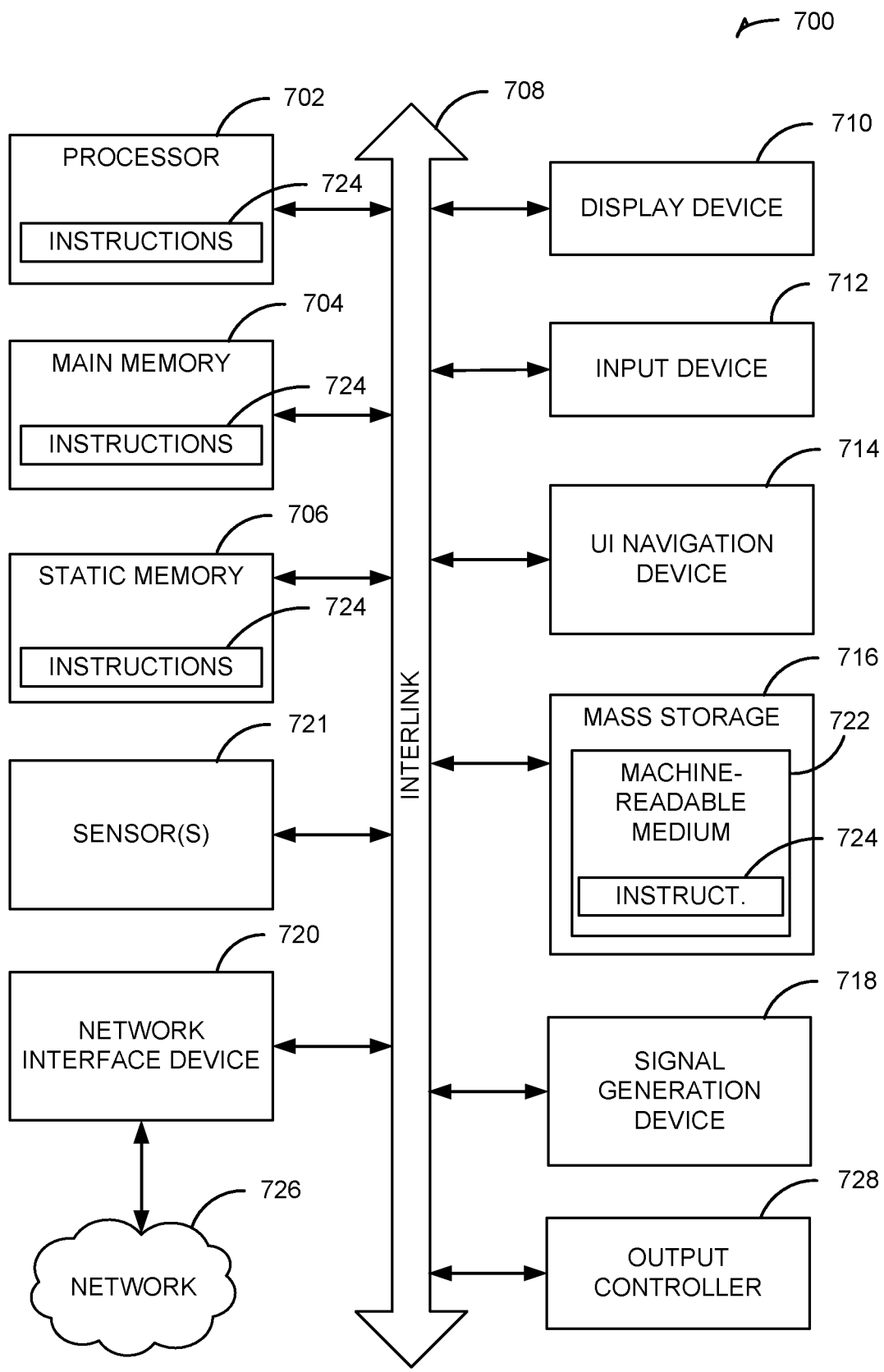
FIG. 7 is a block diagram illustrating an example of a machine upon which one or more embodiments may be implemented.

The vulnerability advisor 215, the mitigation advisor 220, the cyber-physical modeler 230, and the attack path advisor 240 may comprise one or more processors (e.g., hardware processor 602 described in FIG. 6, etc.) that execute software instructions, such as those used to define a software or computer program, stored in a computer-readable storage medium such as a memory device (e.g., a main memory 704 or a static memory 706 as described in FIG. 7, a Flash memory, random access memory (RAM), or any other type of volatile or non-volatile memory that stores instructions), or a storage device (e.g., a disk drive, or an optical drive). Alternatively, the vulnerability advisor 215, the mitigation advisor 220, the cyber-physical modeler 230, and the attack path advisor 240 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

The vulnerability advisor 215, the mitigation advisor 220, and the attack path advisor 240 utilize natural language processing (NLP) and automated web services in to continuously monitor various open sources and closed sources of cyber knowledge. The attack path advisor 240 uses a number of qualitative and quantitative techniques such as graph data mining (e.g., cluster analysis of attack paths, graph-based threat and impact analysis, etc.), Bayesian analysis, and Markov chain analysis. The mitigation advisor 220 performs optimal selection of implementable protection and mitigation controls based on effectiveness and time and cost constraints.

Figure 3:
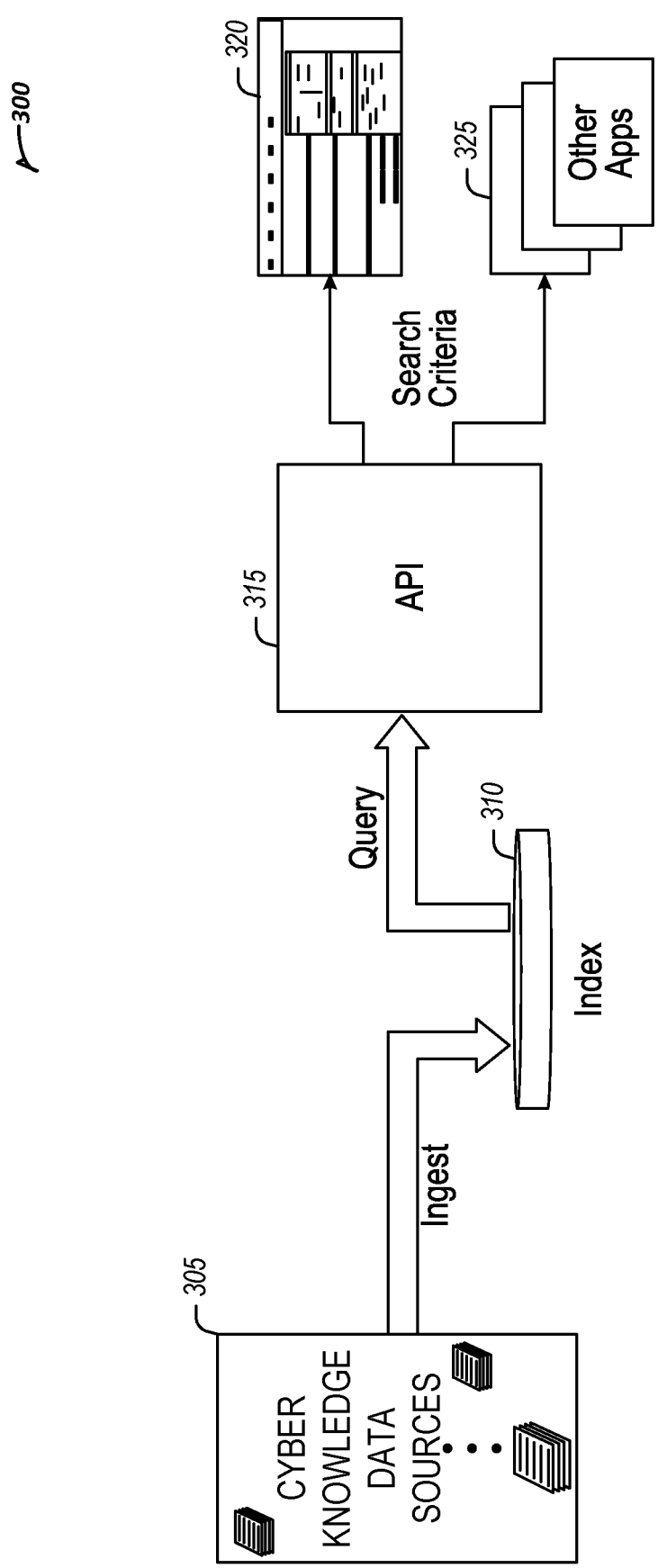
FIG. 3 illustrates an example of vulnerability and mitigation advisor knowledge extraction of cyber knowledge from open and closed sources of information for offline platform information technology cyber-physical risk mitigation, according to an embodiment.

FIG. 3 illustrates an example of vulnerability and mitigation advisor knowledge extraction 300 of cyber knowledge from open and closed sources of information for offline platform information technology cyber-physical risk mitigation, according to an embodiment. An example of cyber knowledge extraction by a vulnerability advisor (e.g., the vulnerability advisor 215 as described in FIG. 2, etc.) and a mitigation advisor (e.g., the mitigation advisor 220 as described in FIG. 2, etc.) is illustrated in FIG. 3. Cyber knowledge data sources 305 are accessed to ingest cyber knowledge data to generate an index 310. The index 310 is queried by a cyber-physical risk mitigation system 320 and other applications 325 using an application programming interface (API) 315 to extract vulnerability data and mitigation data. Example sources of cyber knowledge for the vulnerability and mitigation advisors include, by way of example and not limitation, National Vulnerability Database (NVD) for Cyber Vulnerability Enumerations (CVEs), Common Weakness Enumeration (CWE), and Common Attack Pattern Enumerations and Classifications (CAPEC), MITRE ATT&CK Framework, and MITRE D3FEND Framework.

Figure 4:
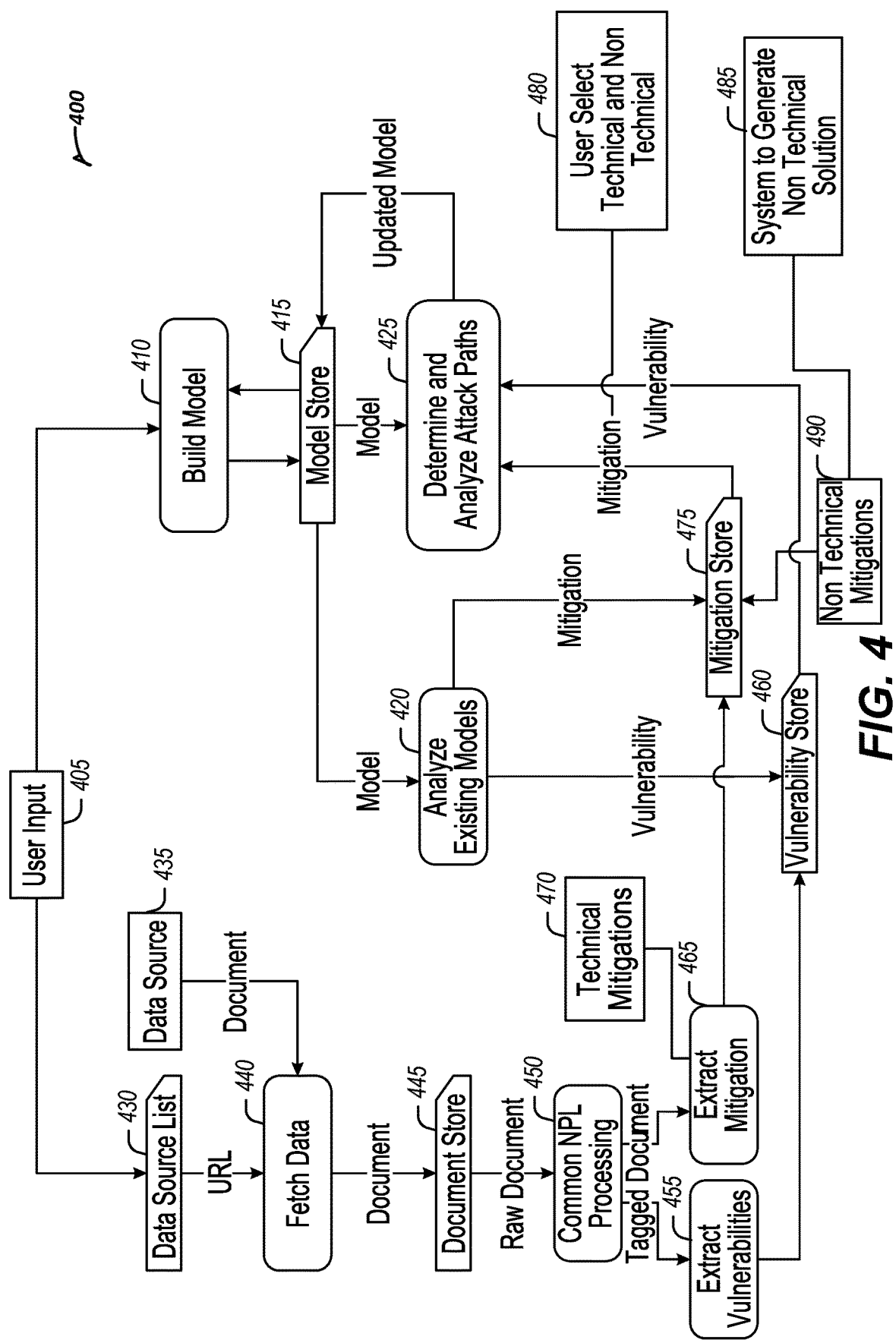
FIG. 4 illustrates an example data flow for natural language processing (NLP)-based vulnerability, mitigation, and attack path advisors for offline platform information technology cyber-physical risk mitigation, according to an embodiment.

FIG. 4 illustrates an example data flow for NLP-based vulnerability (e.g., the vulnerability advisor 215 as described in FIG. 2, etc.), mitigation (e.g., the mitigation advisor 220 as described in FIG. 2, etc.), and attack path (e.g., the attack path advisor 240 as described in FIG. 2, etc.) advisors for offline platform information technology cyber-physical risk mitigation, according to an embodiment. The attack path advisor uses a collection of techniques (e.g., at operation 425) to identify possible routes that an adversary takes to exploit a target node from an entry point that is part of the attack surface. Techniques include, by way of example and not limitation, Conditional Probability Aggregation, Bayesian Analysis, Markov chain analysis, Graph traversal metrics, and Graph data mining (e.g., attack path cluster analysis).

At operation 405, user input is received that is used to build a model at operation 410. The user input is also used to generate a data source list 430. The model is added to a model store 415 and is analyzed at operation 420. The data source list 430 is used to fetch data from the data source 435 at operation 440. The data fetched at operation 440 is used to generate a document store 445 that is processed by common natural language processing (NPL) at operation 450 to generate a tagged document from which vulnerabilities are extracted at operation 455 and mitigations are extracted at operation 465. Technical mitigations data 470 is added to the extracted mitigations and the combined technical and extracted mitigations are added to a mitigation store 475 along with non-technical mitigation data 490 generated by a non-technical solution generation system 485. The vulnerabilities extracted at operation 455 are stored in a vulnerability store 460. The vulnerability store 460 data and the mitigation store data 475 selected by a user at operation 480 are evaluated to determine and analyze attack paths at operation 425. The results of the evaluation are used as inputs to update the model stored in the model store 415.

Figure 5:
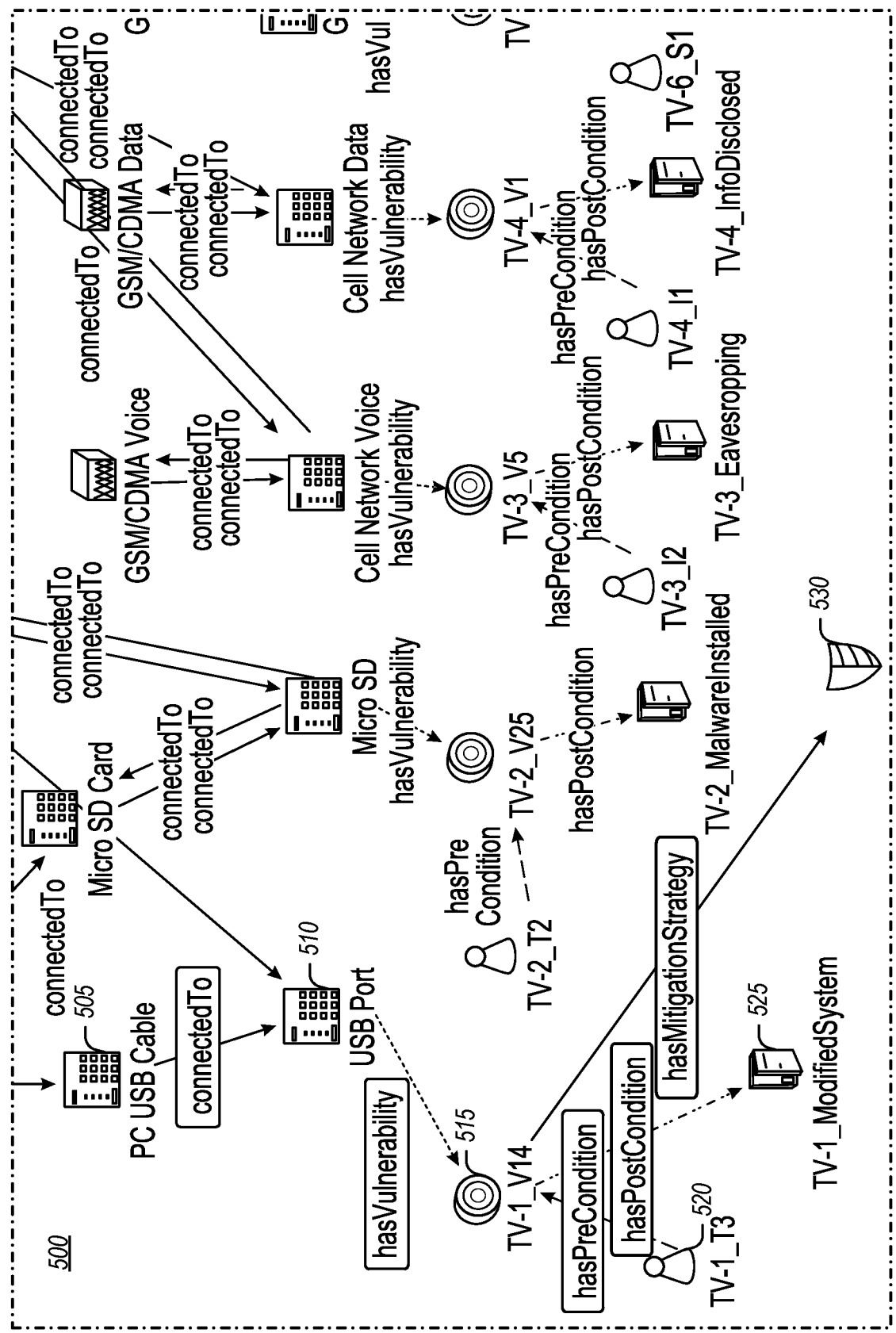
FIG. 5 illustrates an example of a cyber-physical model for a cell-phone model for offline platform information technology cyber-physical risk mitigation, according to an embodiment.

FIG. 5 illustrates an example of a cyber-physical model 500 for a cell-phone model for offline platform information technology cyber-physical risk mitigation, according to an embodiment. The cyber-physical model 500 includes hardware available with the cell-phone model such a USB port 510. The cyber-physical model 500 may also include hardware that may interface with the cell-phone hardware such as a universal serial bus (USB) cable 505 that may be attached to USB port 510. The cyber-physical model 500 includes vulnerabilities identified for the hardware such as vulnerability TV-1_V14 515 for the USB port 510. Preconditions of the vulnerability such as TV-1_T3 520 and post conditions of the vulnerability such as TV-1_ModifiedSystem 525 are included in the model that are evaluated in combination with the vulnerability to establish a mitigation strategy 530 for the vulnerability. The cyber-physical model 500 represents a physical model of a device describing each of the hardware and software components of a system along with vulnerabilities and mitigation strategies. The cyber-physical model 500 may be evaluated using potential attack data to identify components at risk and mitigations available to thwart an attack attempting to exploit an attack path.

FIG. 6 illustrates an example of a method 600 for offline platform information technology cyber-physical risk mitigation, according to an embodiment. The method 600 may provide features as described in FIGS. 1 to 5.

System configuration data may be obtained for a platform information technology (PIT) computing system (e.g., at operation 605). A cyber-physical model may be generated for the PIT computing system using the system configuration data (e.g., at operation 610). An attack path and mitigation data set may be generated from vulnerability and mitigation data (e.g., at operation 615). A risk profile may be generated for the PIT computing system by evaluating the attack path and mitigation data set using the cyber-physical model (e.g., at operation 620). In an example, mission data may be obtained for the PIT computing system and the risk profile may be generated in part using output of a n evaluation of the mission data using the cyber-physical model. A security mitigation action may be automatically triggered based on a vulnerability detected in the risk profile (e.g., at operation 625). In an example, the vulnerability may be a hardware vulnerability for a hardware component of the PIT computing system. In an example, the vulnerability may be a software vulnerability for a software component of the PIT computing system. In an example, the vulnerability may be added to a vulnerability data store. In an example, the cyber-physical model may be evaluated to identify a mitigation for the PIT computing system and the mitigation may be added to a mitigation data store.

In an example, the vulnerability data may be obtained from an external knowledge source. The vulnerability data may be added to a vulnerability data store. The vulnerability data store may be processed using a natural language processor to generate tagged vulnerability data. Vulnerabilities may be identified using the tagged vulnerability data and the attack path and mitigation data set may be generated in part using the vulnerabilities.

In an example, the mitigation data may be obtained from an external knowledge source. The mitigation data may be added to a mitigation data store. The mitigation data store may be processed using a natural language processor to generate tagged mitigation data. Mitigations may be identified using the tagged mitigation data and the attack path and mitigation data set may be generated in part using the mitigations.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensors. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, 3$^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for offline platform information technology (PIT) cyber-physical risk assessment and mitigation comprising:
    at least one processor; and
    memory comprising instruction that, when executed by the at least one processor, cause the at least one processor to perform operations to:
        obtain, through analyst input and ingest of various external data sources, system configuration data for a PIT computing system, wherein the PIT computing system comprises a self-contained mission-critical system of interconnected computing, memory, sensory, and effector elements;
        generate, without requiring access to the PIT computing system, a cyber-physical model for the PIT computing system using the system configuration data, wherein the cyber-physical model hierarchically and topologically models the PIT computing system down to individual hardware and software component levels;
        generate an attack path and mitigation data set from vulnerability data and mitigation data, wherein the attack path comprises a sequence of exploitable control and communication relationships between PIT computing system components that an attacker could traverse from an entry point to a target component within the PIT computing system;
        generate a risk profile for the PIT computing system by evaluating the attack path and mitigation data set using the cyber-physical model without requiring access to the PIT computing system; and
        automatically determine appropriate security mitigation actions based on a vulnerability detected in the risk profile.

2. The system of claim 1, the memory further comprising that, when executed by the at least one processor, cause the at least one processor to perform operations to:
    obtain the vulnerability data from an external knowledge source;
    add the vulnerability data to a vulnerability data store;

process the vulnerability data store using a natural language processor to generate tagged vulnerability data; and identify vulnerabilities using the tagged vulnerability data, wherein the attack path and mitigation data set is generated in part using the vulnerabilities.

3. The system of claim 1, the memory further comprising that, when executed by the at least one processor, cause the at least one processor to perform operations to:

obtain the mitigation data from an external knowledge source;

add the mitigation data to a mitigation data store;

process the mitigation data store using a natural language processor to generate tagged mitigation data; and identify mitigations using the tagged mitigation data, wherein the attack path and mitigation data set is generated in part using the mitigations.

4. The system of claim 1, the memory further comprising that, when executed by the at least one processor, cause the at least one processor to perform operations to add the vulnerability to a vulnerability data store.

5. The system of claim 1, the memory further comprising that, when executed by the at least one processor, cause the at least one processor to perform operations to:

evaluate the cyber-physical model to identify a mitigation for the PIT computing system; and add the mitigation to a mitigation data store.

6. The system of claim 1, wherein the vulnerability is a hardware vulnerability for a hardware component of the PIT computing system.

7. The system of claim 1, wherein the vulnerability is a software vulnerability for a software component of the PIT computing system.

8. The system of claim 1, the memory further comprising that, when executed by the at least one processor, cause the at least one processor to perform operations to obtain mission data for the PIT computing system, wherein the risk profile is generated in part using output of an evaluation of the mission data using the cyber-physical model.

9. At least one non-transitory machine-readable medium comprising instructions for offline platform information technology (PIT) cyber-physical risk assessment and mitigation that, when executed by at least one processor, cause the at least one processor to perform operations to:

obtain, through analyst input and ingest of various external data sources, system configuration data for a PIT computing system, wherein the PIT computing system comprises a self-contained mission-critical system of interconnected computing, memory, sensory, and effector elements;

generate, without requiring access to the PIT computing system, a cyber-physical model for the PIT computing system using the system configuration data, wherein the cyber-physical model hierarchically and topologically models the PIT computing system down to individual hardware and software component levels;

generate an attack path and mitigation data set from vulnerability data and mitigation data, wherein the attack path comprises a sequence of exploitable control and communication relationships between PIT computing system components that an attacker could traverse from an entry point to a target component within the PIT computing system;

generate a risk profile for the PIT computing system by evaluating the attack path and mitigation data set using the cyber-physical model without requiring access to the PIT computing system; and automatically determine appropriate security mitigation actions based on a vulnerability detected in the risk profile.

10. The at least one non-transitory machine-readable medium of claim 9, further comprising that, when executed by the at least one processor, cause the at least one processor to perform operations to:

obtain the vulnerability data from an external knowledge source;

add the vulnerability data to a vulnerability data store;

process the vulnerability data store using a natural language processor to generate tagged vulnerability data; and identify vulnerabilities using the tagged vulnerability data, wherein the attack path and mitigation data set is generated in part using the vulnerabilities.

11. The at least one non-transitory machine-readable medium of claim 9, further comprising that, when executed by the at least one processor, cause the at least one processor to perform operations to:

obtain the mitigation data from an external knowledge source;

add the mitigation data to a mitigation data store;

process the mitigation data store using a natural language processor to generate tagged mitigation data; and identify mitigations using the tagged mitigation data, wherein the attack path and mitigation data set is generated in part using the mitigations.

12. The at least one non-transitory machine-readable medium of claim 9, further comprising that, when executed by the at least one processor, cause the at least one processor to perform operations to add the vulnerability to a vulnerability data store.

13. A method for offline platform information technology (PIT) cyber-physical risk assessment and mitigation comprising:

obtaining, through analyst input and ingest of various external data sources, system configuration data for a PIT computing system, wherein the PIT computing system comprises a self-contained mission-critical system of interconnected computing, memory, sensory, and effector elements;

generating, without requiring access to the PIT computing system, a cyber-physical model for the PIT computing system using the system configuration data, wherein the cyber-physical model hierarchically and topologically models the PIT computing system down to individual hardware and software component levels;

generating an attack path and mitigation data set from vulnerability data and mitigation data, wherein the attack path comprises a sequence of exploitable control and communication relationships between PIT computing system components that an attacker could traverse from an entry point to a target component within the PIT computing system;

generating a risk profile for the PIT computing system by evaluating the attack path and mitigation data set using the cyber-physical model without requiring access to the PIT computing system; and automatically determine appropriate security mitigation actions based on a vulnerability detected in the risk profile.

14. The method of claim 13, further comprising:

obtaining the vulnerability data from an external knowledge source;

adding the vulnerability data to a vulnerability data store;

processing the vulnerability data store using a natural language processor to generate tagged vulnerability data; and identifying vulnerabilities using the tagged vulnerability data, wherein the attack path and mitigation data set is generated in part using the vulnerabilities.

15. The method of claim 13, further comprising:

obtaining the mitigation data from an external knowledge source;

adding the mitigation data to a mitigation data store;

processing the mitigation data store using a natural language processor to generate tagged mitigation data; and identifying mitigations using the tagged mitigation data, wherein the attack path and mitigation data set is generated in part using the mitigations.

16. The method of claim 13, further comprising adding the vulnerability to a vulnerability data store.

17. The method of claim 13, further comprising:

evaluating the cyber-physical model to identify a mitigation for the PIT computing system; and adding the mitigation to a mitigation data store.

18. The method of claim 13, wherein the vulnerability is a hardware vulnerability for a hardware component of the PIT computing system.

19. The method of claim 13, wherein the vulnerability is a software vulnerability for a software component of the PIT computing system.

20. The method of claim 13, further comprising obtaining mission data for the PIT computing system, wherein the risk profile is generated in part using output of an evaluation of the mission data using the cyber-physical model.

\* \* \* \* \*